US012131099B2

(12) United States Patent
Li et al.

(10) Patent No.: US 12,131,099 B2
(45) Date of Patent: Oct. 29, 2024

(54) METHOD AND DEVICE FOR MIXEDLY PLAYING A PROGRAM

(71) Applicant: BEIJING BYTEDANCE NETWORK TECHNOLOGY CO., LTD., Beijing (CN)

(72) Inventors: Yang Li, Beijing (CN); Haiyang Huang, Beijing (CN); Jiarui Xu, Beijing (CN); Bowen Yang, Beijing (CN); Xiangyu Liu, Beijing (CN); Yuxin Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/544,755

(22) Filed: Dec. 19, 2023

(65) Prior Publication Data
US 2024/0118864 A1 Apr. 11, 2024

Related U.S. Application Data

(63) Continuation of application No. PCT/CN2022/096040, filed on May 30, 2022.

(30) Foreign Application Priority Data

Jul. 9, 2021 (CN) .......................... 202110779197.3

(51) Int. Cl.
G06F 3/16 (2006.01)
(52) U.S. Cl.
CPC .................................... G06F 3/165 (2013.01)
(58) Field of Classification Search
CPC ...................................................... G06F 3/165
See application file for complete search history.

(56) References Cited

U.S. PATENT DOCUMENTS

2009/0304359 A1* 12/2009 Lemay ..................... H04N 5/46
345/173
2012/0117042 A1* 5/2012 Durante ............... G11B 27/105
707/705

(Continued)

FOREIGN PATENT DOCUMENTS

CN 102647629 A 8/2012
CN 102665129 A 9/2012

(Continued)

OTHER PUBLICATIONS

International Search Report (with English translation) and Written Opinion issued in PCT/CN2022/096040, dated Sep. 16, 2022, 12 pages provided.

(Continued)

Primary Examiner — Joseph Saunders, Jr.
(74) Attorney, Agent, or Firm — HSML P. C.

(57) ABSTRACT

A method and device for mixedly playing a program are provided by embodiments of the disclosure, the method of mixedly playing a program including: playing, in a first player interface of an application, a first multimedia program in a first list, the application being used to play at least two types of multimedia programs included in the first list; receiving a switching operation in the application, the switching operation being used to instruct the first multimedia program being played to switch to a second multimedia program in the first list; and if a type of the first multimedia program is different from the second multimedia program, playing the second multimedia program in a second player interface of the application, the first player interface and the second player interface being used to play different types of multimedia programs respectively.

20 Claims, 7 Drawing Sheets

(56) References Cited

U.S. PATENT DOCUMENTS

| | | | |
|---|---|---|---|
| 2013/0165164 A1 | 6/2013 | Rowe | |
| 2015/0018992 A1* | 1/2015 | Griffiths et al. | |
| 2016/0371237 A1* | 12/2016 | Fisher | G06F 40/143 |
| 2020/0007917 A1 | 1/2020 | Schneck et al. | |
| 2020/0379716 A1* | 12/2020 | Carrigan | G06F 3/0362 |
| 2020/0379721 A1 | 12/2020 | Liao | |
| 2020/0413152 A1 | 12/2020 | Todorovic et al. | |

FOREIGN PATENT DOCUMENTS

| | | | |
|---|---|---|---|
| CN | 103096172 A | 5/2013 |
| CN | 105975588 A | 9/2016 |
| CN | 106375835 A | 2/2017 |
| CN | 106791953 A | 5/2017 |
| CN | 108462901 A | 8/2018 |
| CN | 112347273 A | 2/2021 |
| CN | 113542817 A | 10/2021 |

OTHER PUBLICATIONS

Office Action issued in Chinese Application No. 202110779197.3, dated Jul. 5, 2022, with machine translation.
Office Action issued in Chinese Application No. 202110779197.3, dated Jan. 12, 2023, with machine translation.
Office Action issued in Chinese Application No. 202110779197.3, dated Apr. 11, 2023, with machine translation.

* cited by examiner

METHOD AND DEVICE FOR MIXEDLY PLAYING A PROGRAM

CROSS REFERENCE

The present application is a continuation of International Patent Application No. PCT/CN2022/096040, filed on May 30, 2022, which claims priority to Chinese Patent Application No. 202110779197.3 filed on Jul. 9, 20221 and entitled "METHOD AND DEVICE FOR MIXEDLY PLAYING A PROGRAM", both of which is incorporated herein by reference in their entireties.

FIELD

Embodiments of the present disclosure generally relate to technical field of computer processing, and specifically, to a method and device for mixedly playing a program.

BACKGROUND

With the increasingly powerful functions of electronic devices, users could experience a variety of applications through electronic devices. A common application is a multimedia application, which allows users to play multimedia programs through the multimedia application on an electronic device. While a multimedia program is playing, a plurality of multimedia programs in a list are usually played.

However, the existing list usually comprises only one type of multimedia program, e.g., only music programs, having a problem of poor richness.

SUMMARY

Embodiments of the present disclosure provide a method and device for mixedly playing a program to improve the richness of multimedia programs in a list.

In a first aspect, embodiments of the present disclosure provide method for mixedly playing a program, comprising:
  playing, in a first player interface of an application, a first multimedia program in a first list, the application being used to play at least two types of multimedia programs comprised in the first list;
  receiving a switching operation in the application, the switching operation being used to instruct the first multimedia program being played to switch to a second multimedia program in the first list; and
  if a type of the first multimedia program is different from the second multimedia program, playing the second multimedia program in a second player interface of the application, the first player interface and the second player interface being used to play different types of multimedia programs respectively.

In a second aspect, embodiments of the present disclosure provide a terminal device, comprising:
  a first multimedia program playing module configured for playing, in a first player interface of an application, a first multimedia program in a first list, the application is used to play at least two types of multimedia programs comprised in the first list;
  a multimedia program switching module configured for receiving a switching operation in the application, the switching operation is used to instruct the first multimedia program being played switching to a second multimedia program in the first list; and
  a second multimedia program playing module configured for, if types of the first multimedia program and the second multimedia program are different, playing the second multimedia program in a second player interface of the application, and the first player interface and the second player interface are respectively used to play different types of multimedia programs.

In a third aspect, embodiments of the present disclosure provide a terminal device, comprising:
  at least one processor and memory;
  the memory storing computer-executable instructions; and
  the computer-executable instructions, when executed by at least one processor, causing the terminal device to implement the method as described in the first aspect.

In a fourth aspect, embodiments of the present disclosure provide a computer-readable storage medium storing computer-executable instructions, the computer-executable instructions, when executed by a processor, implementing the method as described in the first aspect.

In a fifth aspect, embodiments of the present disclosure provide a computer program that, when executed by a processor, implements the method as described in the first aspect.

In a sixth aspect, embodiments of the present disclosure provide a computer program product comprising a computer program, the computer program, when executed by a processor, implementing the method as described in the first aspect.

A method and device for mixedly playing a program are provided by embodiments of the present disclosure, comprising: playing, in a first player interface of an application, a first multimedia program in a first list, the application being used to play at least two types of multimedia programs comprised in the first list; receiving a switching operation in the application, the switching operation being used to instruct the first multimedia program being played to switch to a second multimedia program in the first list; and if a type of the first multimedia program is different from the second multimedia program, playing the second multimedia program in a second player interface of the application, the first player interface and the second player interface being used to play different types of multimedia programs respectively. A plurality of types of multimedia programs can be added to the first list by embodiments of the present disclosure, causing users view a plurality of types of multimedia programs through the first list, improving the richness of multimedia programs of the first list.

BRIEF DESCRIPTION OF THE DRAWINGS

In order to make the embodiment of the present disclosure or the technical solution of prior art clearer, the accompanying drawings used in the embodiment of the present disclosure, or the technical solution of prior art will be described briefly. Obviously, the described drawings are the embodiments of the present disclosure, to ordinary skill in the art, other drawings can further be obtained based on the following drawings without creative labor.

DETAILED DESCRIPTION

In order to make the purpose, technical solution, and advantages of the embodiment of the present disclosure clearer, embodiments of the present disclosure of the present disclosure will be described clearly and completely in the following in conjunction with the accompanying drawings. Obviously, the described embodiments are a part of the embodiments of the present disclosure, not all the embodiments. Based on the embodiments of the present disclosure, all other embodiments obtained by ordinary skill in the art without creative labor fall within the scope of protection of the present disclosure.

Figure 1:
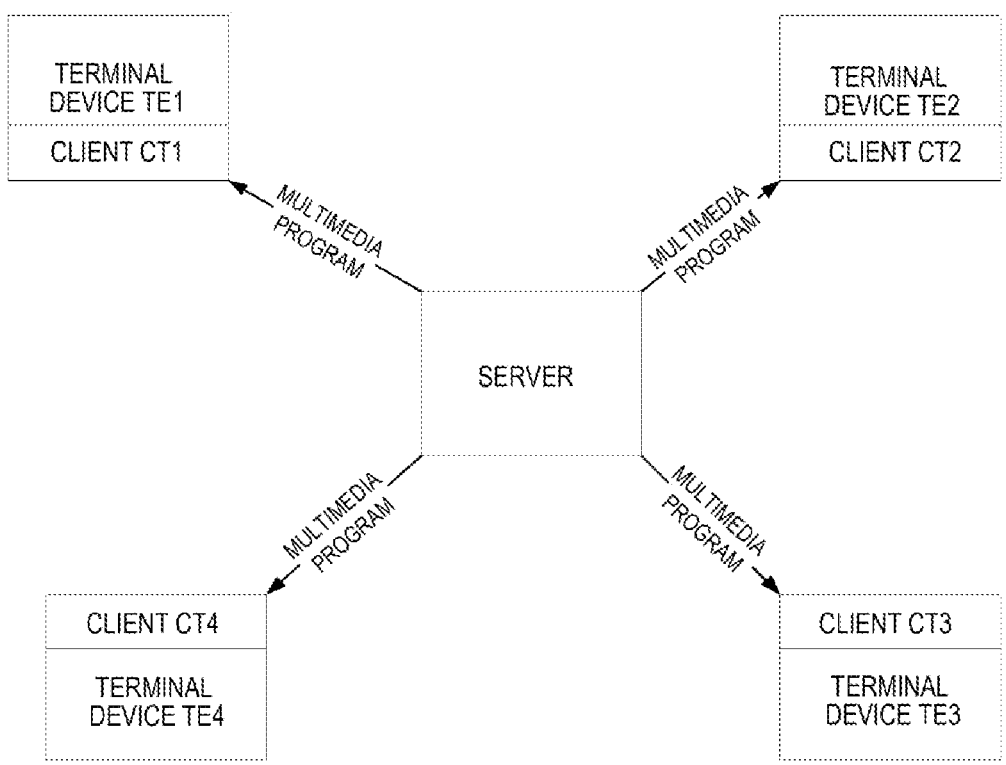
FIG. 1 illustrates a schematic diagram of a playing scenario of a multimedia program applied by embodiments of the present disclosure.

Embodiments of the present disclosure can be applied to a playing scenario of a multimedia program, wherein the multimedia program can comprise music programs, podcast programs, video programs, etc. FIG. 1 illustrates a schematic diagram of a playing scenario of a multimedia program applied by embodiments of the present disclosure. Referring to FIG. 1, a client CT1 is running on a terminal device TE1, a client CT2 is running on a terminal device TE2, a client CT3 is running on a terminal device TE3, and a client CT4 is running on a terminal device TE4. The terminal devices TE1, TE2, TE3, and TE4 can obtain at least one multimedia program from a server, to play in the local clients CT1, CT2, CT3, and CT4, respectively.

Herein, the above clients are multimedia applications that can be run on the terminal device, and the server is a device, corresponding to a client, that provides multimedia programs to the client.

It can be understood that in practical applications, a server can access a large number of clients, not limited to the four clients in FIG. 1. Further, there can also be a plurality of servers to improve a speed of sending multimedia programs to clients, not limited to the one server in FIG. 1.

In prior art, each client can obtain a list from a server before multimedia programs. The list is obtained by the server based on a certain algorithm, and the list comprises a plurality of multimedia programs, so the client can play the multimedia programs of the list.

However, the server adds one type of multimedia program to a list, so that the client can only play the type of plurality of multimedia programs after receiving the list. As a result, a user can only view one type of multimedia program when watching a list of multimedia programs, which results a poor richness.

In order to solve the above problems, embodiments of the present disclosure can add a plurality of types of multimedia programs to a list, so that the user can view a plurality of types of multimedia programs through a list, improving the richness of multimedia programs in a list.

The technical solutions of the embodiments of the present disclosure and how the technical solutions of the present disclosure solve the above technical problems are described in detail below by specific embodiments. The specific embodiments below can be combined with each other, and the same or similar concepts or processes cannot be repeated in certain embodiments. Embodiments of the present disclosure will be described below in conjunction with the accompanying drawings.

Figure 2:
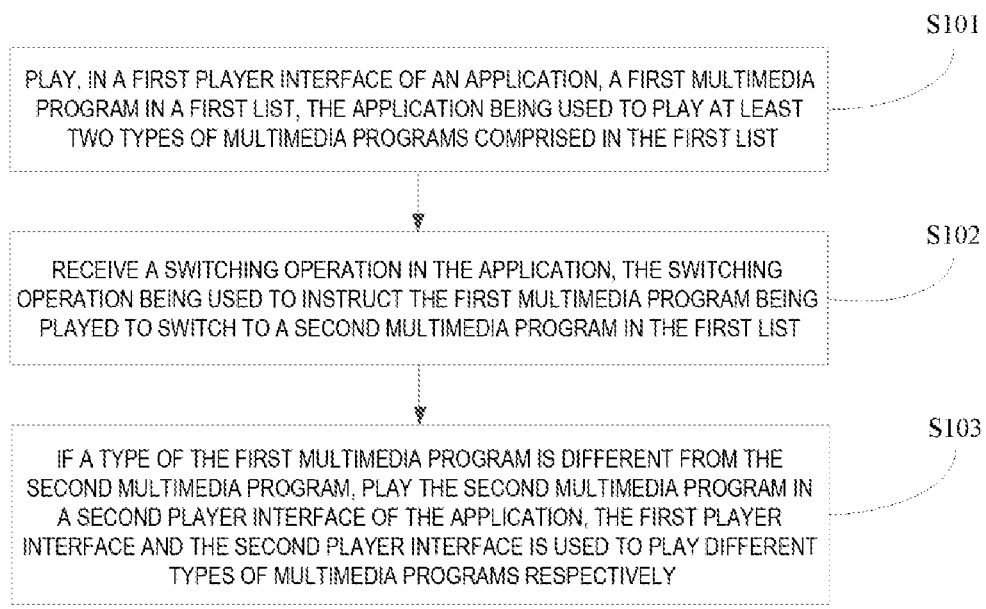
FIG. 2 illustrates a flowchart of steps of a method of mixedly playing a program provided by embodiments of the present disclosure.

FIG. 2 illustrates a flowchart of steps of a method of mixedly playing a program provided by embodiments of the present disclosure. The method shown in FIG. 2 can be applied to the terminal device, and the steps of a method of mixedly playing a program can be performed by the terminal device. Referring to FIG. 2, the method of mixedly playing a program comprises S101 to S103:

S101: playing, in a first player interface of an application, a first multimedia program in a first list, the application being used to play at least two types of multimedia programs comprised in the first list.

Herein, the application is the multimedia application mentioned above.

Respective multimedia program comprised in the first list belongs to at least two types, each type corresponds to a player interface for playing this type of multimedia program. Therefore, the type of the first multimedia program is the type corresponding to the first player interface, and the first player interface is used to play multimedia programs of the same type as the first multimedia program.

In embodiments of the present disclosure, at least two types of multimedia programs can comprise at least: a music program, and a podcast program.

Herein the music program can be audio music or music that comprises both audio and video. In embodiments of the present disclosure, the music program can be determined as a first type of multimedia program, the first multimedia program can be the first type of multimedia program, i.e., a music program.

The podcast program is a network audio program, and the podcast program is usually an audio program. In embodiments of the present disclosure, the podcast program can be determined as a second type of multimedia program. In the case that the type of the second multimedia program is different from the type of the first multimedia program, the second multimedia program can be the second type of multimedia program, i.e., a podcast program.

S102: receiving a switching operation in the application, the switching operation being used to instruct the first multimedia program being played to switch to a second multimedia program in the first list.

In the above application, the playing of a multimedia program can be switched in the first list based on the user's switching operation.

Herein the switching operation can be a sliding operation of the user in the application, a click operation on a specified control. Embodiments of the present disclosure are not limited to the switching operation.

In embodiments of the present disclosure, the multimedia program being played before switching is called the first multimedia program, and the switched multimedia program is called the second multimedia program. The first multimedia program and the second multimedia program are both multimedia programs in the first list.

It should be noted that the first multimedia program and the second multimedia program can be of the same type, so after receiving the switching operation, there is no need to switch a display player interface, the second multimedia program can be displayed in the first player interface. In other words, the above application plays the first multimedia application through the first player interface before switching, the above application plays the second multimedia interface through the first player interface after switching.

Certainly, the first multimedia program and the second multimedia program can be of different types, so after receiving the switching operation, it is necessary to switch the display player interface and the multimedia program. In other words, the above application plays the first multimedia application through the first player interface before switching, the above application plays the second multimedia interface through the second player interface after switching. The specifics can be referred to the detailed description of S103.

S103: if a type of the first multimedia program is different from the second multimedia program, playing the second multimedia program in a second player interface of the application, the first player interface and the second player interface being used to play different types of multimedia programs respectively.

Herein, the second player interface is used to play multimedia programs of the same type as the second multimedia program. When the second multimedia program is a podcast program, the second player interface is used to play podcast programs.

It should be noted that when S101 is being performed, i.e., when one first type of multimedia program is being played on the first player interface, the application displays the first player interface and at least one multimedia program to be played. Herein, the first player interface and the multimedia program to be played respectively occupy parts of an application area.

When S103 is being performed, i.e., when one second type of multimedia program is being played on the second player interface, the application displays the second player interface and at least one multimedia program to be played. Herein, the second player interface and the multimedia program to be played occupy parts of an application area.

The above multimedia programs to be played comprise: at least one first type of multimedia program and/or at least one second type of multimedia program. When the first type of multimedia program is a music program and the second type of multimedia program is a podcast program, the above multimedia programs to be played can comprise: at least one music program and at least one podcast program.

In order to play different types of multimedia programs, the first player interface and the second player interface can be two player interfaces comprising different controls, which are used to display information of different types of multimedia programs and/or control the playing of different types of multimedia programs.

Specifically, in the first player interface, relevant information of the first type of multimedia program and controls for controlling a playing progress of the first type of multimedia program are displayed.

Figure 3:
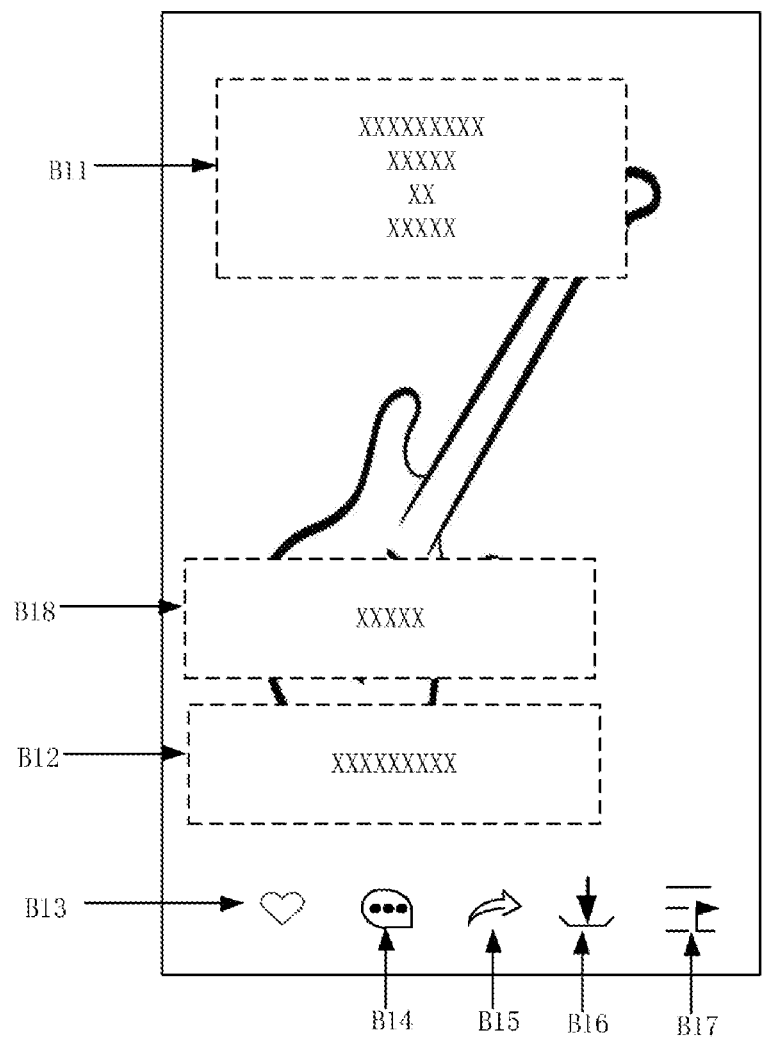
FIG. 3 illustrates a schematic diagram of a first player interface provided by embodiments of the present disclosure.

FIG. 3 illustrates a schematic diagram of a first player interface provided by embodiments of the present disclosure.

Referring to FIG. 3, B11 is used to display the content of the first type of multimedia program. For example, when the first type of multimedia program is a music program, B11 is used to display the lyrics of the music program.

Referring to FIG. 3, B12 is used to display the name of the first type of multimedia program and the owner of the multimedia program. For example, when the first type of multimedia program is a music program, B12 is used to display the name, singer, etc. of the music program.

Referring to FIG. 3, B13 is a control used to collect the first type of multimedia program being played. For example, when the first type of multimedia program is a music program, B13 is used to collect the music program being played.

Referring to FIG. 3, B14 is a control for commenting on the first type of multimedia program being played. A comment text box can be displayed by clicking B14. For example, when the first type of multimedia program is a music program, clicking on B14 can comment on the music program being played.

Referring to FIG. 3, B15 is a control for reposting the first type of multimedia program being played. The target contact for reposting can be selected by clicking on the B15. For example, when the first type of multimedia program is a music program, clicking on B15 can repost the currently playing music program.

Referring to FIG. 3, B16 is a control for downloading the first type of multimedia program being played. For example, when the first type of multimedia program is a music program, clicking on B16 can download the music program being played.

Referring to FIG. 3, B17 is a clickable control, and the user can click on B17 to view the first list and click on the multimedia program in the first list, implementing the switched-playing of the multimedia program in the first list.

Further, in order to distinguish different player interfaces, a type of multimedia program playable by the player interface can be displayed in each player interface. Referring to FIG. 3, B18 is used to display the type of multimedia program playable by the first player interface, i.e., the first type. For example, when the first type of multimedia program is a music program, the content displayed by B18 can be "music".

Relevant information of the second type of multimedia program can be displayed in the second player interface. The second player interface generally does not comprise controls for controlling the playing progress of the second type of multimedia program.

Figure 4:
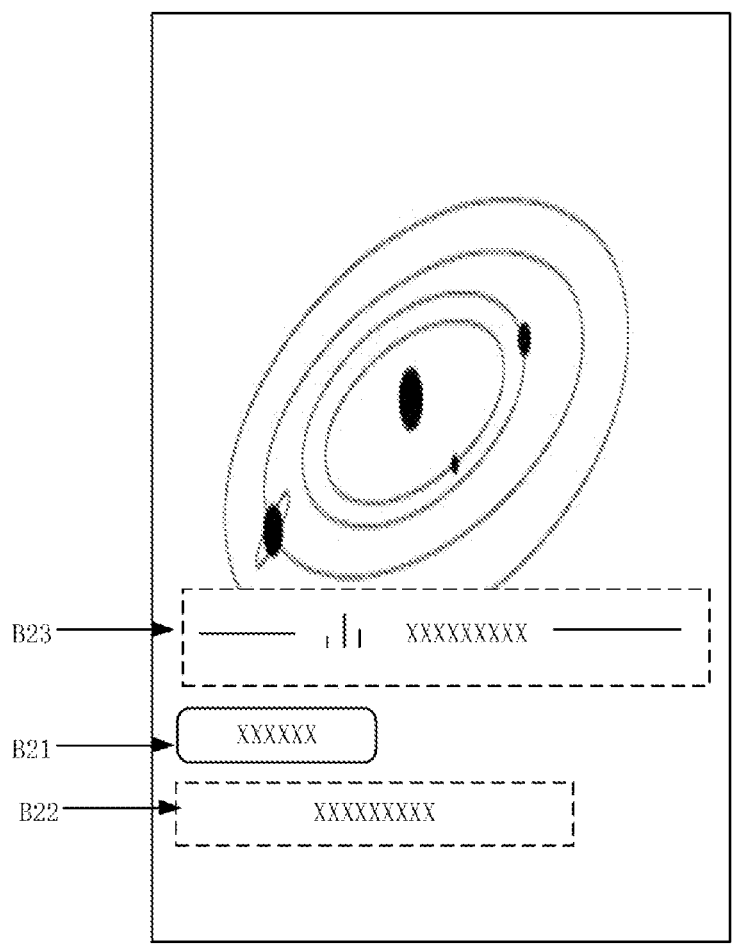
FIG. 4 illustrates a schematic diagram of a second player interface provided by embodiments of the present disclosure.

FIG. 4 illustrates a schematic diagram of a second player interface provided by embodiments of the present disclosure.

A type of multimedia program playable by the second player interface is the second type, i.e., podcast program. At this time, the second player interface further displays prompt information.

Referring to FIG. 4, B21 is used to display the type of multimedia program playable by the second player interface, i.e., the second type. For example, when the second type of multimedia program is a podcast program, the content displayed by B21 can be "podcast".

Referring to FIG. 4, B22 is used to display the name of the second type of multimedia program being played. For example, when the second type of multimedia program is a podcast program, B22 is used to display the name of the podcast program being played.

Referring to FIG. 4, B23 is a control for displaying prompt information, the prompt information is used to prompt entering into a third player interface of the application, and the third player interface is used to play at least one second type of multimedia program comprised in a second list. When the second type of multimedia program is a podcast program, embodiments of the present disclosure can play at least one podcast program in the third player interface.

In the third player interface, the user can switch, by sliding up and down, to play multimedia programs in the second list; or click any position in the third player interface to stop playing a multimedia program; or click any position in the third player interface again to continue playing a multimedia program.

Figure 5:
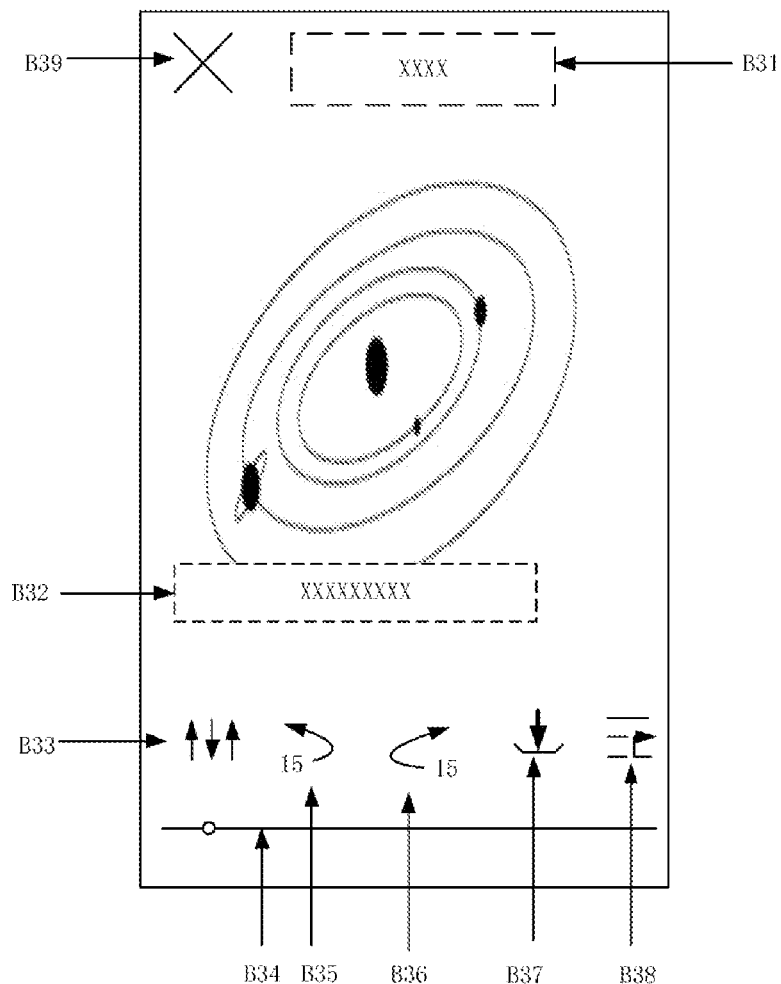
FIG. 5 illustrates a schematic diagram of a third player interface provided by embodiments of the present disclosure.

FIG. 5 illustrates a schematic diagram of a third player interface provided by embodiments of the present disclosure.

Referring to FIG. 5, B31 is a label for the third player interface to distinguish between the third player interface and the second player interface. For example, when the second type of multimedia program is a podcast program, B31 can display "podcast room".

Referring to FIG. 5, there is also B32 in the third player interface to display the name of the second type of multimedia program being played.

Referring to FIG. 5, B33 is a clickable control that the user can click to control the playing of sound effects.

Referring to FIG. 5, B34 is a slider that the user can drag to adjust the second type of multimedia program being played.

Referring to FIGS. 5, B35 and B36 are two clickable controls. Each time the user clicks on B35, the progress of the second type of multimedia program being played can be adjusted forward by 15 seconds. Each time the user clicks on B36, the progress of the second type of multimedia program being played can be adjusted backward by 15 seconds.

Referring to FIG. 5, B37 is a clickable control, and the user can click on B37 to download the second type of multimedia program being played.

Referring to FIG. 5, B38 is a clickable control. The user can click on B38 to view the second list and click on the second type of multimedia program in the second list, implementing the switched-playing of multimedia programs in the second list.

Certainly, the third player interface can also display the remaining controls, which are not limited by embodiments of the present disclosure. For example, the user can click on the remaining controls to view optional playing modes, comprising: one or more loop playing, sequential playing, and random playing, to select a playing mode.

When the application displays the second player interface, the user can access the third player interface described above through the second player interface. Specifically, the terminal device receives a first operation comprising at least one of: a confirmation operation of the second type of multimedia program being played, a confirmation operation of the second type of multimedia program to be played, and a background running operation received when one second type of the multimedia program is played; and in response to the first operation, the terminal device playing the multimedia program corresponding to the first operation in the third player interface.

It should be noted that when the second player interface is playing the second type of multimedia program in full screen, the user can conduct a confirm operation to the second type of multimedia program being played in full screen to enter the third player interface; the user can also conduct a background running operation to enter the third player interface. At this time, the second type of multimedia program played in full screen by the second player interface starts to be played in the third player interface.

When the second type of multimedia program being played on the second player interface only occupies a part of the second player interface, the user can not only conduct a confirm operation to the second type of multimedia program being played to enter the third player interface, but also start playing the second type of multimedia program being played in a part of the second player interface in the third player interface; the user can further conduct a confirm operation to the second type of multimedia program to be played displayed in the remaining areas of the second player interface to enter the third player interface, and start playing the second type of multimedia program to be played in the third player interface; the user can further conduct a background running operation to enter the third player interface and start playing the second type of multimedia program being played in a part of the second player interface in the third player interface.

Embodiments of the present disclosure can not only provide the user who prefers the second type of multimedia document with a third player interface for playing the second type of multimedia document but can also diversify the ways of entering the third player interface.

In embodiments of the present disclosure, the user can also manually close the third player interface to stop displaying the third player interface. Specifically, the terminal device can receive a second operation, and in response to the second operation, stop displaying the third player interface and display the second player interface.

Specifically, a close control can be set in the third player interface, as B39 shown in FIG. 5. After the user clicks on B39, the application no longer displays the third player interface but displays the second player interface. At this time, the second multimedia program triggered when entering the third player interface can be displayed in the second player interface. In this way, the user can flexibly switch between the second player interface and the third player interface, improving the user experience.

It should be noted that when the third player interface is stopped from being displayed, the third player interface can run in the background or stop running. Compared to running in the background, stopping the third player interface can save processor and memory resources occupied by the application.

It can be seen that the first player interface, the second player interface, and the third player interface are the three player interfaces of the application. During the running of the application, it is possible to switch from the first player interface to the second player interface, or from the second player interface to the third player interface, or from the third player interface to the second player interface.

The three player interfaces mentioned above can be different interfaces of the same player so that controls in the player can be adjusted to implement switching between different player interfaces. At this time, the switching of player interfaces can be implemented through an if statement. For example, when the first type of multimedia program is being played, controls of the first player interface are drawn in the player; when the second type of multimedia program is being played, controls of the second player interface are drawn in the player; and when the third type of multimedia program is being played, controls of the third player interface are drawn in the player. Since there is only one player, there is no need for interaction between a plurality of players when switching the player interface, and the implementation is relatively simple.

Certainly, the three player interfaces mentioned above can also be interfaces of three different players so that players can be switched to implement switching between different player interfaces. Due to a plurality of players, interaction between the plurality of players is required when switching player interfaces, which is more complex to implement. For example, when the second player interface is started, the stop running of the player corresponding to the first player interface needs to be implemented through the interaction between the two players.

At least one second type of multimedia program of the second list is generated by the server based on user behavior.

When the user using the above terminal device is an old user, i.e., the user has accessed the second type of multimedia program, the server can extract the second type of multimedia program that the user has accessed from the user behavior record as a reference multimedia program. Thus, the remaining multimedia programs of the second type associated with the reference multimedia program are added to the second list.

When the user using the terminal device is a new user, i.e., the user has not accessed the second type of multimedia program, the server may extract the second type of multimedia program that has been accessed by the user as a reference multimedia program from the user behavior record of the user. Thereby, the remaining multimedia programs of the second type associated with the reference multimedia program are added to the second list.

Each time the terminal device enters the third player interface, it can request the second list from the server, and the server sends the real-time second list generated to the terminal device.

It can be seen that in the method of mixedly playing the program in FIG. 2, the multimedia program played is the multimedia program of the first list. The process of generating the first list will be described in detail below. In embodiments of the present disclosure, the process of generating the first list can be performed by the terminal device or the server. When the first list is generated by the server, the server can send the first list to the terminal device after generating the first list, so that the terminal device can play the multimedia program in the first list. The way of generating the first list can comprise three types.

In the first method, if at least one target access record of a target user is comprised in playing logs, the first list is obtained by inserting at least one multimedia program to be inserted into the first type of multimedia programs based on an insertion probability of an accessed location, the multimedia program to be inserted being the second type of multimedia program, the insertion probability of the access position being determined based on an access frequency of the access position comprised in at least one target access record, the access position being a position between two adjacent multimedia programs of the first type, a target access record of the target user being an access record of the target user to the second type of multimedia program.

In the second method, if a target access record of a target user is missed in playing logs and target access records of other user different from the target user are comprised in the playing logs, the first list is obtained by inserting at least one multimedia program to be inserted into the first type of multimedia programs based on an insertion probability of an accessed location, the insertion probability of the access position being determined based on an access frequency of the access position comprised in a target access record of other user, and target access records of the other user being an access record of other user to the second type of multimedia program.

In the third method, when an access record of the second type of multimedia program is missed in playing logs, at least one multimedia program to be inserted is inserted into at least one fixed position, the fixed position being a position between two adjacent multimedia programs of the first type.

Herein, the playing logs record behavior information of at least one user of the application in S101 using the application. The user behavior record can comprise at least one pieces of the behavior information: behavior information of at least one user accessing the first type of multimedia program, behavior information of at least one user accessing the second type of multimedia program. The playing logs are recorded in the server.

It should be noted that the above accesses can be played, bookmarked, downloaded, shared, etc.

The above target user is the user requesting the terminal device of the first list. The target user can be divided into two categories: old users and new users. When the target access record of the target user exists in the user behavior record, the target user is an old user; when the target access record of the target user does not exist in the user behavior record, the target user is a new user.

For the old user, the insertion probability of the accessed location can be determined through the first method. For the new user, the insertion probability of the accessed location can be determined through the second method.

Herein, the access frequency of the access location can be an access frequency and/or a number of accesses within a specified time period. Herein, the access frequency is the number of accesses per unit period, which can be a ratio of the number of accesses within the specified period to the duration of the specified period. The specified period can be a period prior to the current time.

If there are five target access records L1 to L5 within the specified period. Herein, the access position in L1 is A1, the user is U1; the access position in L2 is A1, the user is U1; the access position in L3 is A2, the user is U1; the access position in L4 is A1, the user is U1; the access position in L5 is A3, and the user is U2.

For target user U1, since there are three target access records comprising access location A1 and target user U1: L1, L2, and L4, the number of accesses to access address A1 is 3; since there is one target access record comprising access address A2 and target user U1: L3, the number of accesses to access address A2 is 1. Since there are no target access records comprising access address A3 and target user U1, the number of accesses to access address A3 is 0. Therefore, for target user U1, the insertion probability of access location A1 is the highest, followed by the insertion probability of access location A2, and the insertion probability of access address A3 is the smallest.

For target user U3, since there is no target access record comprising target user U3, the insertion probability of the accessed location can be determined based on the access frequency of the access locations comprised in the target access records of other users U1 and U2. Specifically, because there are three target access records comprising access location A1, target user U1, or U2: L1, L2, and L4, the number of accesses to access address A1 is 3; since there is one target access record comprising access address A2, target user U1, or U2: L3, the number of accesses to access address A2 is 1. Since there is one target access record comprising access address A3, target user U1, or U2: L5, the number of accesses to access address A3 is 1. Therefore, for target user U3, the insertion probability of access location A1 is the highest, and the insertion probabilities of access locations A2 and A3 are the same and smaller than the insertion probability of access location A1.

The insertion probability of the access position can be a function of the access frequency of the above access position, i.e., the larger the access frequency of the access position, the higher the insertion probability of the access position. Conversely, the smaller the access frequency of the access position, the lower the insertion probability of the access position. Based on the relationship, a function relationship between the access frequency and the insertion probability can be established, to determine the insertion probability based on the access frequency. Herein, input and output of the function relationship are the above positive relationships.

After determining the insertion probability through the first or second method described above, the first type of multimedia program can be inserted between the second type of multimedia programs to obtain the first list.

Herein, the first type of multimedia program can be a multimedia program related to the first type of multimedia program historically accessed by the target user, or other multimedia programs of the first type historically accessed more by other users and related multimedia programs.

Specifically, the multimedia program to be inserted can be prioritized to be inserted into the access position with a higher probability, and one or more multimedia programs to be inserted can be inserted into an access position. For example, a multimedia program to be inserted can be inserted into the access position with the highest insertion probability, and the insertion probabilities of the access positions can be arranged in descending order. Then, one or more multimedia programs can be inserted into each access position in the order. The access position with the higher insertion probability can be inserted into more multimedia programs.

It should be noted that there can be no access record for the second type of multimedia program in the above playing logs, i.e., no user accesses the second type of multimedia program. In this case, the third method can be exploited to generate the first list. The fixed position in the third method is predetermined, and the fixed position can be one or more, and one or more multimedia programs to be inserted can be inserted into each fixed position.

The multimedia program to be inserted can be generated based on at least one of the types of information: an update time of the second type of multimedia program, whether the second type of multimedia program being subscribed, and a correlation between the second type of multimedia program historically accessed by a user.

When determining the multimedia program to be inserted based on the update time of the second type of multimedia program, the second type of multimedia program with an update time close to the current time can be determined as the multimedia program to be inserted with a priority.

When determining the multimedia program to be inserted based on whether the second type of multimedia program being subscribed, the second type of multimedia program subscribed by the target user or other users can be determined as the multimedia program to be inserted with a priority.

When determining the multimedia program to be inserted based on the correlation between the second type of multimedia program historically accessed by a user, the second type of multimedia program with a higher correlation can be determined as the multimedia program to be inserted.

Alternatively, when the multimedia program to be inserted comprises at least two multimedia programs, any two multimedia programs to be inserted belong to different program sets. Herein, a plurality of multimedia programs comprised in each program set are related. For example, when the multimedia program to be inserted is a podcast program, different podcast programs in the same program set are subject-related, or content-related, or provided by the same provider. Thus, embodiments of the present disclosure can insert multimedia programs from different program sets into the first list as much as possible, avoiding the insertion of multimedia programs that are related, and improving the diversity of the first list.

When the multimedia program to be inserted is not obtained based on the above method, all the second type of multimedia programs provided in the server can be determined as the multimedia programs to be inserted. When the number of obtained multimedia programs to be inserted is less than a predetermined number, the multimedia programs to be inserted obtained last time can be added to the multimedia programs to be inserted obtained this time to bring the multimedia programs to be inserted to the predetermined number.

The server can conduct de-duplication processing according to a predetermined rule when determining the multimedia programs to be inserted. For example, for the target user, the multimedia programs that have been inserted into the first list before the current time can be removed from the multimedia programs to be inserted, avoiding repeated playing of the second type of multimedia program within a certain period and improving user experience. The predetermined period can be flexibly set, for example, it can be set to 7 days.

Certainly, the terminal device can also record the second type of multimedia program previously received in the first list, and when a first list is received again, the recorded multimedia program can be removed from the first list. The terminal device can periodically delete the recorded second type of multimedia program, for example, it can periodically delete the recorded second type of multimedia program three days ago, to avoid playing the second type of multimedia program repeatedly within 3 days.

It should be noted that when displaying the first player, the second player, or the third player mentioned above, if the application exits due to an abnormality when the application is restarted again, the first list may be re-obtained and the player corresponding to the first multimedia program in the first list may be displayed to start the playing of the first multimedia program.

Figure 6:
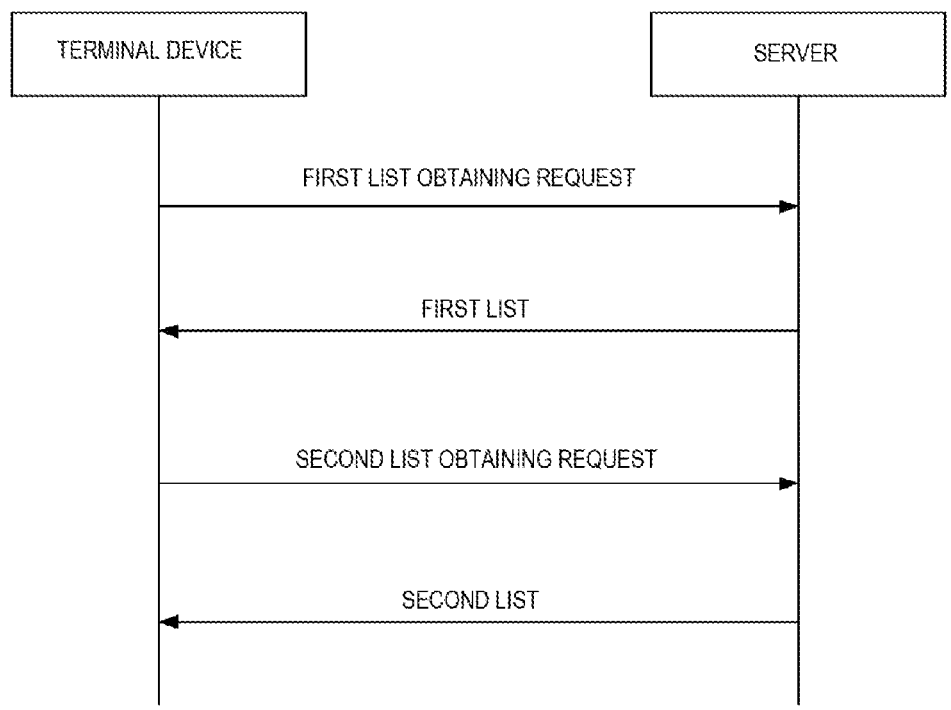
FIG. 6 illustrates a schematic diagram of an interaction between a terminal device and a server provided by embodiments of the present disclosure.

When the first list is generated by the server, interaction needs to be conducted between the terminal device and the server. FIG. 6 illustrates a schematic diagram of an interaction between a terminal device and a server provided by embodiments of the present disclosure. Referring to FIG. 6, firstly, the terminal device sends a first list obtaining request to the server, the first list obtaining request is generated by the terminal device when the terminal device receives the user's refresh operation. The user may obtain a predetermined number of multimedia programs at once through a refresh operation when using the application to play the multimedia programs; then, the user may play the multimedia document in the first list on the terminal device, and when the user conducts the aforementioned first operation, the terminal device generates a second list obtaining request and sends it to the server; finally, the server generates a second list and sends it to the terminal device.

Figure 7:
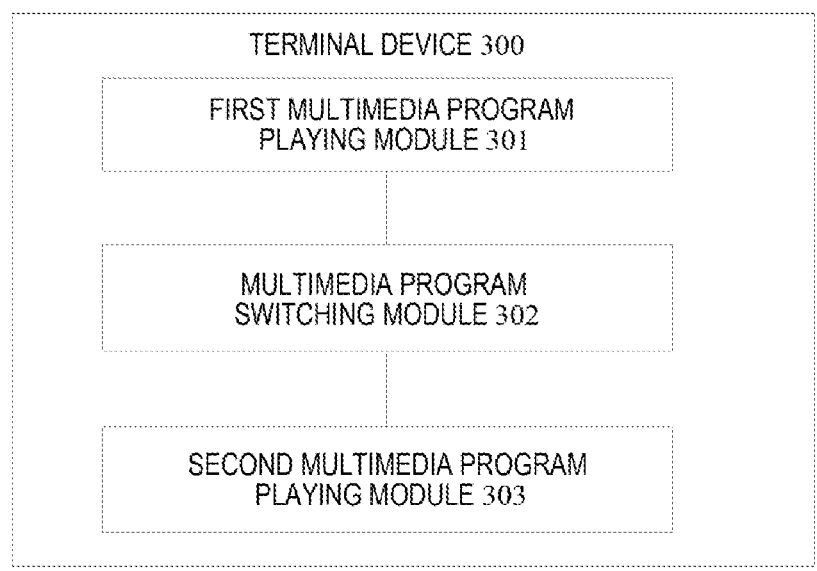
FIG. 7 illustrates a structural block diagram of a terminal device provided by embodiments of the present disclosure.

Corresponding to the embodiments of the method of mixedly playing a program, FIG. 7 illustrates a structural block diagram of a terminal device provided by embodiments of the present disclosure. For purposes of illustration, only those parts relevant to embodiments of the present disclosure are shown. Referring to FIG. 7, the terminal device 300 comprises: a first multimedia program playing module 301, a multimedia program switching module 302 and a second multimedia program playing module 303.

Herein, the first multimedia program playing module 301 is configured for playing, in a first player interface of an application, a first multimedia program in a first list, the application being used to play at least two types of multimedia programs comprised in the first list.

The multimedia program switching module 302 is configured for receiving a switching operation in the application, the switching operation being used to instruct the first multimedia program being played to switch to a second multimedia program in the first list.

The second multimedia program playing module 303 is configured for, if a type of the first multimedia program is different from the second multimedia program, playing the second multimedia program in a second player interface of the application, the first player interface and the second player interface being used to play different types of multimedia programs respectively.

Alternatively, the first player interface and the second player interface are two player interfaces comprising different controls, the different controls being respectively used to display information of different types of the multimedia programs, and/or control playing of different types of the multimedia programs.

Alternatively, the first player interface displays a type of the multimedia program playable by the first player interface, and/or the second player interface displays a type of the multimedia program playable by the second player interface.

Alternatively, when a type of the multimedia program playable by the second player interface is a second type, the second player interface further displays prompt information, the prompt information being used to prompt entering into a third player interface of the application, the third player interface being used to play the at least one second type of multimedia program comprised in a second list.

Alternatively, the third player interface displays at least one of controls: a control for controlling a playing progress, a control for switching between different multimedia programs, and a control for downloading a multimedia program being played.

Alternatively, when one first type of multimedia program is being played on the first player interface, the application displays the first player interface and at least one multimedia program to be played; when one second type of multimedia program is being played on the second player interface, the application displays the second player interface and at least one multimedia program to be played.

Alternatively, the terminal device 300 further comprises a first operation receiving module and a third multimedia program playing module:

The first operation receiving module is configured to receive a first operation comprising at least one of: a confirmation operation of the second type of multimedia program being played, a confirmation operation of the second type of multimedia program to be played, and a background running operation received when one second type of the multimedia program is played.

The third multimedia program playing module is configured to, in response to the first operation, play the multimedia program corresponding to the first operation in the third player interface.

Alternatively, the terminal device 300 further comprises a second operation receiving module and a stop displaying module:

The second operation receiving module is configured to receive a second operation.

The stop displaying module is configured to, in response to the second operation, stop displaying the third player interface and display the second player interface.

Alternatively, the terminal device 300 further comprises:

A stop running module is configured to, after stopping displaying the third player interface, stop running the third player interface.

Alternatively, the first type of multimedia program is a music program, and the second type of multimedia program is a podcast program.

Alternatively, if at least one target access record of a target user is comprised in playing logs, the first list is obtained by inserting at least one multimedia program to be inserted into the first type of multimedia programs based on an insertion probability of an accessed location, the multimedia program to be inserted being the second type of multimedia program, the insertion probability of the access position being determined based on an access frequency of the access position comprised in at least one target access record, the access position being a position between two adjacent multimedia programs of the first type, a target access record of the target user being an access record of the target user to the second type of multimedia program.

Alternatively, if a target access record of a target user is missed in playing logs and target access records of other user different from the target user are comprised in the playing logs, the first list is obtained by inserting at least one multimedia program to be inserted into the first type of multimedia programs based on an insertion probability of an accessed location, the insertion probability of the access position being determined based on an access frequency of the access position comprised in a target access record of other user, and target access records of the other user being an access record of other user to the second type of multimedia program.

Alternatively, when an access record of the second type of multimedia program is missed in playing logs, at least one multimedia program to be inserted is inserted into at least one fixed position, the fixed position being a position between two adjacent multimedia programs of the first type.

Alternatively, the terminal device further comprises:

A program to be inserted determination module configured to determine the multimedia program to be inserted based on at least one of: an update time of the second type of multimedia program, whether the second type of multimedia program being subscribed, and a correlation between the second type of multimedia program historically accessed by a user.

Alternatively, if the multimedia program to be inserted comprises at least two multimedia programs, any two multimedia programs to be inserted belong to different program sets.

The terminal device provided in embodiments of the present disclosure can be used to perform the technical solution of the method embodiments shown in FIG. 2, which is similar to the implementation principle and technical effect, the embodiment of the present disclosure is not repeated here.

Figure 8:
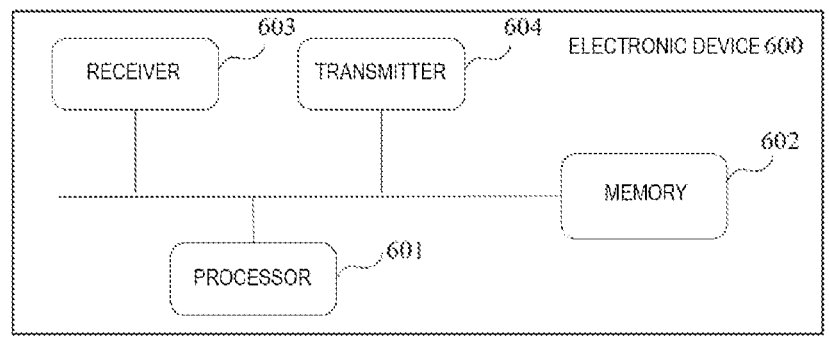
FIGS. 8-9 illustrate a structural block diagram of two electronic devices provided by embodiments of the present disclosure.

The terminal device can be referred to as an electronic device, FIG. 8 illustrates a structural block diagram of an electronic device provided by embodiments of the present disclosure. The electronic device 600 comprises memory 602 and at least one processor 601;

Herein, the memory 602 stores computer-executable instructions;

The computer-executable instructions stored in the memory 602, when executed by at least one processor 601, causing the terminal device to implement the method of mixed-playing a program in FIG. 2.

Further, the electronic device can also comprise a receiver 603 and a transmitter 604. The receiver 603 is used to receive information from other apparatuses or devices and send it to the processor 601. The transmitter 604 is used to send information to other apparatuses or devices.

Figure 9:
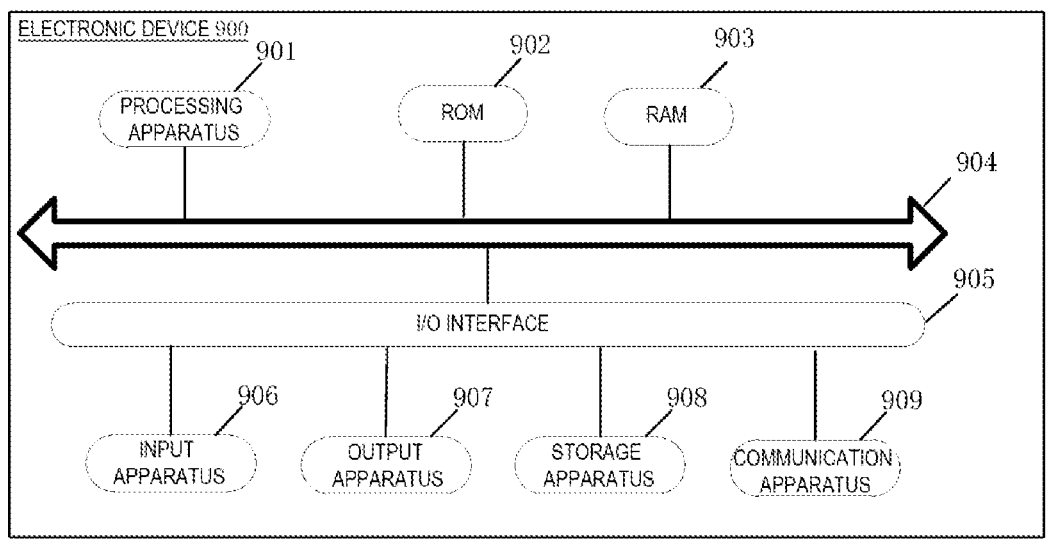

Further, FIG. 9 illustrates a structural block diagram of another electronic device provided by embodiments of the present disclosure, the electronic device 900 can be a terminal device. Herein, the terminal device can comprise but is not limited to, such cell phones, laptop computers, digital broadcast receivers, personal digital assistants (Personal Digital Assistant, abbreviated as PDA), tablet computers (Portable Android Device, abbreviated as PAD), portable multimedia players (Portable Media Player, abbreviated as PMP), vehicle terminals (such as vehicle navigation terminals) and other mobile terminals and fixed terminals such as digital TV, desktop computers and so on. Media Player referred to as PMP), vehicle terminals (such as vehicle navigation terminals), and other mobile terminals, as well as fixed terminals such as digital TV, desktop computers, and so on. The electronic device illustrated in FIG. 9 is only an example and should not impose any limitation on the functionality and scope of use of the embodiment of the present disclosure.

As illustrated in FIG. 9, the electronic device 900 can comprise a processing apparatus (such as a central processing unit, graphics processor, etc.) 901, which can execute various appropriate actions and processes according to a program stored in a read-only memory (Read Only Memory, ROM for short) 902 or loaded from a storage apparatus 908 into a random access memory (Random Access Memory, RAM for short) 903. In the RAM 903, various programs and data required for the operation of the electronic device 900 are also stored. The processing apparatus 901, the ROM 902, and the RAM 903 are connected to each other through the bus 904. An Input/Output (I/O) interface 905 is also connected to bus 904.

Generally, the following apparatuses can be connected to the I/O interface 905: comprising an input apparatus 906 such as touch screens, touch pads, keyboards, mice, cameras, microphones, accelerometers, gyroscopes, etc.; comprising, for example, Liquid Crystal Display (LCD for short), an output apparatus 907 such as a speaker, a vibrator, etc.; a storage apparatus 908 such as a magnetic tape, a hard disk, etc.; and a communication apparatus 909. The communication apparatus 909 may allow the electronic device 900 to conduct wireless or wired communication with other devices to exchange data. Although FIG. 9 illustrates the electronic device 900 with various apparatuses, it should be understood that it is not required to implement or have all the illustrated apparatuses. Alternatively, more, or fewer apparatuses may be implemented or provided.

Specifically, according to the embodiments of the present disclosure, the process described above with reference to the flow diagram can be implemented as a computer software program. For example, an embodiment of the present disclosure comprises a computer program product, which comprises a computer program carried on a computer-readable medium, and the computer program comprises a program code for executing the method shown in the flowchart. In such embodiments, the computer program can be downloaded and installed from the network through the communication apparatus 909, installed from the storage apparatus 908, or installed from the ROM 902. When the computer program is executed by the processing apparatus 901, the above functions defined in the embodiment of the present disclosure are executed.

It should be noted that the computer-readable medium mentioned in the present disclosure can be a computer-readable signal medium, a computer-readable storage medium, or any combination of the two. The computer-readable storage medium can be, for example, but not limited to, an electrical, magnetic, optical, electromagnetic, infrared, or semiconductor system, apparatus, or device, or a combination of any of the above. More specific examples of the computer-readable storage medium may comprise but are not limited to electrical connections with one or more wires, portable computer disks, hard disks, random access memory (RAM), read-only memory (ROM), Erasable Programmable Read-Only Memory (EPROM or flash memory for short), optical fiber, Portable Compact Disk Read-Only Memory (CD-ROM for short), optical storage devices, magnetic storage devices, or any suitable combination of the above. In the present disclosure, a computer-readable storage medium may be any tangible medium that contains or stores a program, which may be used by or in combination with an instruction execution system, apparatus, or device. In the present disclosure, the computer-readable signal medium may comprise data signals propagated in the baseband/or as part of the carrier, wherein a computer-readable program code is carried. The propagation of data signals can adopt various forms, comprising but not limited to electromagnetic signals, optical signals, or any suitable combination of the above. The computer-readable signal medium can also be any computer-readable medium other than a computer-readable storage medium. The computer-readable signal medium may send, propagate, or transmit programs for use by or in combination with instruction execution systems, apparatuses, or devices. The program code contained on the computer-readable medium can be transmitted by any suitable medium, comprising but not limited to wire, optical cable, Radio Frequency (RF for short), etc., or any suitable combination of the above.

The computer-readable medium may be comprised in the electronic device, or it may exist alone without being assembled into the electronic device.

The computer-readable medium carries one or more programs, and when one or more programs are executed by the electronic device, the electronic device is caused to execute the method shown in the embodiment.

The computer program code used to execute the operations of the present disclosure may be written in one or more programming languages or a combination thereof. The programming languages comprise object-oriented programming languages—such as Java, Smalltalk, and C++, and conventional procedural programming languages—such as "C" language or similar programming languages. The program code can be executed entirely on the user's computer, partly on the user's computer, executed as an independent software package, partly on the user's computer, partly executed on a remote computer, or entirely executed on the remote computer or server. In the case of a remote computer, the remote computer can be connected to the user's computer through any kind of network-comprising a Local Area Network (LAN for short) or a Wide Area Network (WAN for short)—or it can be connected to an external computer (for example, using an Internet service provider to connect via the Internet).

The flow diagrams and block diagrams in the accompanying drawings illustrate the possible impossible architecture, functions, and operations of systems, methods, and computer program products according to various embodiments in the present disclosure. At this point, each block in a flow diagram or block diagram can represent a module, program segment, or part of code that contains one or more executable instructions for implementing specified logical functions. It should also be noted that in some alternative implementations, the functions indicated in the blocks can also occur in a different order than those indicated in the accompanying drawings. For example, two consecutive blocks can actually be executed in parallel, and sometimes they can also be executed in the opposite order, depending on the function involved. It should also be noted that each block in the block diagram and/or flow diagram, as well as the combination of blocks in the block diagram and/or flow diagram, can be implemented using dedicated hardware-based systems that execute specified functions or operations or can be implemented using a combination of dedicated hardware and computer instructions.

The units involved in the embodiments described in the present disclosure may be implemented by way of software or by way of hardware. Herein, the name of the unit does not constitute a limitation on the unit per se under certain circumstances. For example, a first obtaining unit can also be described as "a unit for obtaining at least two Internet Protocol addresses."

The functions described above may be at least partially executed by one or more hardware logic components. For example, without limitation, example types of hardware logic components that can be used comprise: Field Programmable Gate Array (FPGA for short), Application Specific Integrated Circuit (ASIC for short), Application Specific Standard Product (ASSP for short), System-on-a-chip (SOC for short), Complex Programmable Logical device (CPLD for short), and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may comprise but is not limited to, an electronic, magnetic, optical, electromagnetic, infrared, or semiconductor system, apparatus, or device, or any suitable combination of the foregoing. More specific examples of machine-readable storage media would comprise electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In a first example of the first aspect, embodiments of the present disclosure provide a method for mixedly playing a program, comprising:
    playing, in a first player interface of an application, a first multimedia program in a first list, the application being used to play at least two types of multimedia programs comprised in the first list;
    receiving a switching operation in the application, the switching operation being used to instruct the first multimedia program being played to switch to a second multimedia program in the first list; and
    if a type of the first multimedia program is different from the second multimedia program, playing the second multimedia program in a second player interface of the application, the first player interface and the second player interface being used to play different types of multimedia programs respectively.

Based on the first example of the first aspect, in a second example of the first aspect, the first player interface and the second player interface are two player interfaces comprising different controls, the different controls being respectively used to display information of different types of the multimedia programs, and/or control playing of different types of the multimedia programs.

Based on the second example of the first aspect, in a third example of the first aspect, the first player interface displays a type of the multimedia program playable by the first player interface, and/or the second player interface displays a type of the multimedia program playable by the second player interface.

Based on the third example of the first aspect, in a fourth example of the first aspect, when a type of the multimedia program playable by the second player interface is a second type, the second player interface further displays prompt information, the prompt information is used to prompt entering into a third player interface of the application, the third player interface is used to play the at least one second type of multimedia program comprised in a second list.

Based on the fourth example of the first aspect, in a fifth example of the first aspect, the third player interface displays at least one of controls: a control for controlling a playing progress, a control for switching between different multimedia programs, and a control for downloading a multimedia program being played.

Based on the fifth example of the first aspect, in a sixth example of the first aspect, when one first type of multimedia program is being played on the first player interface, the application displays the first player interface and at least one multimedia program to be played; when one second type of multimedia program is being played on the second player interface, the application displays the second player interface and at least one multimedia program to be played.

Based on the sixth example of the first aspect, in a seventh example of the first aspect, the method further comprises:
    receiving a first operation comprising at least one of: a confirmation operation of the second type of multimedia program being played, a confirmation operation of the second type of multimedia program to be played, and a background running operation received when one second type of the multimedia program is played; and
    in response to the first operation, playing the multimedia program corresponding to the first operation in the third player interface.

Based on the seventh example of the first aspect, in an eighth example of the first aspect, the method further comprises:
    receiving a second operation; and
    in response to the second operation, stopping displaying the third player interface and displaying the second player interface.

Based on the eighth example of the first aspect, in a ninth example of the first aspect, further comprises, after stopping displaying the third player interface:
    stopping running the third player interface.

Based on the sixth example of the first aspect, in a tenth example of the first aspect, the first type of multimedia program is a music program, and the second type of multimedia program is a podcast program.

Based on the sixth example of the first aspect, in an eleventh example of the first aspect, if at least one target access record of a target user is comprised in playing logs, the first list is obtained by inserting at least one multimedia program to be inserted into the first type of multimedia programs based on an insertion probability of an accessed location, the multimedia program to be inserted being the second type of multimedia program, the insertion probability of the access position being determined based on an access frequency of the access position comprised in at least one target access record, the access position being a position between two adjacent multimedia programs of the first type, a target access record of the target user being an access record of the target user to the second type of multimedia program.

Based on the sixth example of the first aspect, in a twelfth example of the first aspect, if a target access record of a target user is missed in playing logs and target access records of other users different from the target user are comprised in the playing logs, the first list is obtained by inserting at least one multimedia program to be inserted into the first type of multimedia programs based on an insertion probability of an accessed location, the insertion probability of the access position being determined based on an access frequency of the access position comprised in a target access record of other user, and target access records of the other user being an access record of other user to the second type of multimedia program.

Based on the sixth example of the first aspect, in a thirteenth example of the first aspect, when an access record of the second type of multimedia program is missed in playing logs, at least one multimedia program to be inserted is inserted into at least one fixed position, the fixed position being a position between two adjacent multimedia programs of the first type.

Based on any one of the eleventh to thirteenth examples of the first aspect, in a fourteenth example of the first aspect, the multimedia program to be inserted is determined based on at least one of: an update time of the second type of multimedia program, whether the second type of multimedia program being subscribed, and a correlation between the second type of multimedia program historically accessed by a user.

Based on any one of the eleventh to thirteenth examples of the first aspect, in a fifteenth example of the first aspect, if the multimedia program to be inserted comprises at least two multimedia programs, any two multimedia programs to be inserted belong to different program sets.

In a first example of the second aspect, a terminal device is provided, comprising:
  A first multimedia program playing module configured for playing, in a first player interface of an application, a first multimedia program in a first list, the application being used to play at least two types of multimedia programs comprised in the first list;
  A multimedia program switching module configured for receiving a switching operation in the application, the switching operation being used to instruct the first multimedia program being played to switch to a second multimedia program in the first list; and
  A second multimedia program playing module configured for, if a type of the first multimedia program is different from the second multimedia program, playing the second multimedia program in a second player interface of the application, the first player interface and the second player interface being used to play different types of multimedia programs respectively.

Based on the first example of the second aspect, in a second example of the second aspect, the first player interface and the second player interface are two player interfaces comprising different controls, the different controls being respectively used to display information of different types of the multimedia programs, and/or control playing of different types of the multimedia programs.

Based on the second example of the second aspect, in a third example of the second aspect, the first player interface displays a type of the multimedia program playable by the first player interface, and/or the second player interface displays a type of the multimedia program playable by the second player interface.

Based on the third example of the second aspect, in a fourth example of the second aspect, when a type of the multimedia program playable by the second player interface is a second type, the second player interface further displays prompt information, the prompt information is used to prompt entering into a third player interface of the application, the third player interface is used to play the at least one second type of multimedia program comprised in a second list.

Based on the fourth example of the second aspect, in a fifth example of the second aspect, the third player interface displays at least one of controls: a control for controlling a playing progress, a control for switching between different multimedia programs, and a control for downloading a multimedia program being played.

Based on the fifth example of the second aspect, in a sixth example of the second aspect, when one first type of multimedia program is being played on the first player interface, the application displays the first player interface and at least one multimedia program to be played; when one second type of multimedia program is being played on the second player interface, the application displays the second player interface and at least one multimedia program to be played.

Based on the sixth example of the second aspect, in a seventh example of the second aspect, the terminal device further comprises a first operation receiving module and a third multimedia program playing module:
  The first operation receiving module is configured to receive a first operation comprising at least one of: a confirmation operation of the second type of multimedia program being played, a confirmation operation of the second type of multimedia program to be played, and a background running operation received when one second type of the multimedia program is played.
  The third multimedia program playing module is configured to, in response to the first operation, play the multimedia program corresponding to the first operation in the third player interface.

Based on the seventh example of the second aspect, in an eighth example of the second aspect, the terminal device further comprises a second operation receiving module and a stop displaying module:
  The second operation receiving module is configured to receive a second operation.
  The stop displaying module is configured to, in response to the second operation, stop displaying the third player interface and display the second player interface.

Based on the eighth example of the second aspect, in a ninth example of the second aspect, the terminal service further comprises:
  A stop running module is configured to, after stopping displaying the third player interface, stop running the third player interface.

Based on the sixth example of the second aspect, in a tenth example of the second aspect, the first type of multimedia program is a music program, and the second type of multimedia program is a podcast program.

Based on the sixth example of the second aspect, in an eleventh example of the second aspect, if at least one target access record of a target user is comprised in playing logs, the first list is obtained by inserting at least one multimedia program to be inserted into the first type of multimedia programs based on an insertion probability of an accessed location, the multimedia program to be inserted being the second type of multimedia program, the insertion probability of the access position being determined based on an access frequency of the access position comprised in at least one target access record, the access position being a position between two adjacent multimedia programs of the first type, a target access record of the target user being an access record of the target user to the second type of multimedia program.

Based on the sixth example of the second aspect, in a twelfth example of the second aspect, if a target access record of a target user is missed in playing logs and target access records of other users different from the target user are comprised in the playing logs, the first list is obtained by inserting at least one multimedia program to be inserted into the first type of multimedia programs based on an insertion probability of an accessed location, the insertion probability of the access position being determined based on an access frequency of the access position comprised in a target access record of other user, and target access records of the other user being an access record of other user to the second type of multimedia program.

Based on the sixth example of the second aspect, in a thirteenth example of the second aspect, when an access record of the second type of multimedia program is missed in playing logs, at least one multimedia program to be inserted is inserted into at least one fixed position, the fixed position being a position between two adjacent multimedia programs of the first type.

Based on any one of the eleventh to thirteenth examples of the second aspect, in a fourteenth example of the second aspect, the terminal device further comprises:

A program to be inserted determination module configured to determine the multimedia program to be inserted based on at least one of: an update time of the second type of multimedia program, whether the second type of multimedia program being subscribed, and a correlation between the second type of multimedia program historically accessed by a user.

Based on any one of the eleventh to thirteenth examples of the second aspect, in a fifteenth example of the second aspect, if the multimedia program to be inserted comprises at least two multimedia programs, any two multimedia programs to be inserted belong to different program sets.

In a third aspect, based on one or more embodiments of the present disclosure, a terminal device is provided, comprising: at least one processor and memory;
  the memory storing computer-executable instructions; and
  the computer-executable instructions, when executed by at least one processor, causing the terminal device to implement the method as described in the first aspect.

In a fourth aspect, based on one or more embodiments of the present disclosure, a computer-readable storage medium storing computer-executable instructions is provided, the computer-executable instructions, when executed by a processor, implementing the method as described in the first aspect.

In a fifth aspect, based on one or more embodiments of the present disclosure, a computer program is provided that, when executed by a processor, implements the method as described in the first aspect.

In a sixth aspect, based on one or more embodiments of the present disclosure, a computer program product is provided, comprising a computer program, the computer program, when executed by a processor, implementing the method as described in the first aspect.

The above description is only a preferred embodiment of the present disclosure and an explanation of the principles of the technique applied. It should be understood by those skill in the art that the scope of disclosure involved in the present disclosure is not limited to technical solutions resulting from a particular combination of the aforesaid technical features but shall also cover other technical solutions resulting from any combination of the aforesaid technical features or their equivalents without being separated from the aforesaid disclosed ideas. For example, the technical scheme formed by the substitution of the above features with the technical features disclosed in the present disclosure (but not limited to) having similar functions.

Furthermore, although each operation is depicted in a specific order, this should not be understood as requiring them to be executed in the specific order shown or in a sequential order. Under certain circumstances, multitasking and parallel processing may be advantageous. Similarly, although several specific implementation details are comprised in the above discussion, these should not be interpreted as limiting the scope of the present disclosure. Some features described in the context of individual embodiments can also be combined and implemented in a single embodiment. On the contrary, various features described in the context of a single embodiment can also be implemented individually or in any suitable sub-combination in a plurality of embodiments.

Although the subject matter has been described in language specific to structural features and/or method logical actions, it should be understood that the subject matter limited in the accompanying claims may not necessarily be limited to the specific features or actions described above. On the contrary, the specific features and actions described above are only example forms of implementing the claims.

We claim:

1. A method for mixedly playing a program, comprising:
  playing, in a first player interface of an application, a first multimedia program in a first list, the application being used to play at least two types of multimedia programs comprised in the first list, the at least two types of multimedia programs comprising an audio program and a video program;
  receiving a switching operation in the application, the switching operation being used to instruct the first multimedia program being played to switch to a second multimedia program in the first list; and
  if a type of the first multimedia program is different from the second multimedia program, playing the second multimedia program in a second player interface of the application, the first player interface and the second player interface being used to play different types of multimedia programs respectively, wherein the type of the first multimedia program is a first type;
  wherein when a type of the multimedia program playable by the second player interface is a second type different from the first type, the second player interface further displays prompt information, the prompt information being used to prompt entering into a third player interface of the application, the third player interface being used to play at least one multimedia program of the second type comprised in a second list.

2. The method of claim 1, wherein the first player interface and the second player interface are two player interfaces comprising different controls, the different controls being respectively used to display information of different types of the multimedia programs, and/or control playing of different types of the multimedia programs.

3. The method of claim 1, wherein the first player interface displays a type of the multimedia program playable by the first player interface, and/or the second player interface displays a type of the multimedia program playable by the second player interface.

4. The method of claim 1, wherein the third player interface displays at least one of controls: a control for controlling a playing progress, a control for switching between different multimedia programs, and a control for downloading a multimedia program being played.

5. The method of claim 1, wherein when one first type of multimedia program is being played on the first player interface, the application displays the first player interface and at least one multimedia program to be played; when one second type of multimedia program is being played on the second player interface, the application displays the second player interface and at least one multimedia program to be played.

6. The method of claim 5, wherein if at least one target access record of a target user is comprised in playing logs, the first list is obtained by inserting at least one multimedia program to be played into the first type of multimedia programs based on an insertion probability of an accessed location, the at least one multimedia program to be played being the second type of multimedia program, the insertion probability of the access position being determined based on an access frequency of the access position comprised in at least one target access record, the access position being a position between two adjacent multimedia programs of the first type, a target access record of the target user being an access record of the target user to the second type of multimedia program.

7. The method of claim 6, wherein the at least one multimedia program to be played is determined based on at least one of: an update time of the second type of multimedia program, whether the second type of multimedia program being subscribed, and a correlation between the second type of multimedia program historically accessed by a user.

8. The method of claim 6, wherein if the at least one multimedia program to be played comprises at least two multimedia programs, any two multimedia programs to be played belong to different program sets.

9. The method of claim 5, wherein if a target access record of a target user is missed in playing logs and target access records of other user different from the target user are comprised in the playing logs, the first list is obtained by inserting at least one multimedia program to be played into the first type of multimedia programs based on an insertion probability of an accessed location, the insertion probability of the access position being determined based on an access frequency of the access position comprised in a target access record of other users, and target access records of the other user being an access record of other user to the second type of multimedia program.

10. The method of claim 5, wherein when an access record of the second type of multimedia program is missed in playing logs, at least one multimedia program to be played is inserted into at least one fixed position, the fixed position being a position between two adjacent multimedia programs of the first type.

11. The method of claim 1, wherein the method further comprises:
receiving a first operation comprising at least one of: a confirmation operation of the second type of multimedia program being played, a confirmation operation of the second type of multimedia program to be played, and a background running operation received when one second type of the multimedia program is played; and
in response to the first operation, playing the multimedia program corresponding to the first operation in the third player interface.

12. The method of claim 1, wherein the method further comprises:
receiving a second operation; and
in response to the second operation, stopping displaying the third player interface and displaying the second player interface.

13. The method of claim 12, further comprising, after stopping displaying the third player interface:
stopping running the third player interface.

14. The method of claim 1, wherein the first type of multimedia program is a music program, and the second type of multimedia program is a podcast program.

15. A non-transitory computer-readable storage medium storing computer-executable instructions, the computer-executable instructions, when executed by a processor, causing a computing device to implement acts comprising:
playing, in a first player interface of an application, a first multimedia program in a first list, the application being used to play at least two types of multimedia programs comprised in the first list, the at least two types of multimedia programs comprising an audio program and a video program;
receiving a switching operation in the application, the switching operation being used to instruct the first multimedia program being played to switch to a second multimedia program in the first list; and
if a type of the first multimedia program is different from the second multimedia program, playing the second multimedia program in a second player interface of the application, the first player interface and the second player interface being used to play different types of multimedia programs respectively, wherein the type of the first multimedia program is a first type,
wherein when a type of the multimedia program playable by the second player interface is a second type different from the first type, the second player interface further displays prompt information, the prompt information being used to prompt entering into a third player interface of the application, the third player interface being used to play at least one multimedia program of the second type comprised in a second list.

16. The non-transitory computer-readable storage medium of claim 15, wherein the first player interface and the second player interface are two player interfaces comprising different controls, the different controls being respectively used to display information of different types of the multimedia programs, and/or control playing of different types of the multimedia programs.

17. The non-transitory computer-readable storage medium of claim 15, wherein the first player interface displays a type of the multimedia program playable by the first player interface, and/or the second player interface displays a type of the multimedia program playable by the second player interface.

18. The non-transitory computer-readable storage medium of claim 15, wherein the third player interface displays at least one of controls: a control for controlling a playing progress, a control for switching between different multimedia programs, and a control for downloading a multimedia program being played.

19. The non-transitory computer-readable storage medium of claim 15, wherein when one first type of multimedia program is being played on the first player interface, the application displays the first player interface and at least one multimedia program to be played; when one second type of multimedia program is being played on the second player interface, the application displays the second player interface and at least one multimedia program to be played.

20. The non-transitory computer-readable storage medium of claim 15, wherein the computer-executable instructions, when executed by the processor, causing the computing device to further implement acts comprising:
   receiving a first operation comprising at least one of: a confirmation operation of the second type of multimedia program being played, a confirmation operation of the second type of multimedia program to be played, and a background running operation received when one second type of the multimedia program is played; and
   in response to the first operation, playing the multimedia program corresponding to the first operation in the third player interface.

* * * * *